W. F. Collier,
Animal Trap.

No. 99,995.   Patented Feb. 15. 1870.

Witnesses   Inventor
Thos. H. Dodge   Wm. F. Collier
Geo. H. Miller

United States Patent Office.

WILLIAM F. COLLIER, OF WORCESTER, MASSACHUSETTS, ASSIGNOR TO HOWE, BIGELOW & CO.

Letters Patent No. 99,995, dated February 15, 1870.

IMPROVED ANIMAL TRAP.

The Schedule referred to in these Letters Patent and making part of the same.

*To all whom it may concern:*

Be it known that I, WILLIAM F. COLLIER, of the city and county of Worcester, and Commonwealth of Massachusetts, have invented certain new and useful Improvements in Animal Traps; and I do hereby declare that the following is a full, clear, and exact description of the same, reference being had to the accompanying drawings forming part of this specification, in which—

Figures 1, 2:
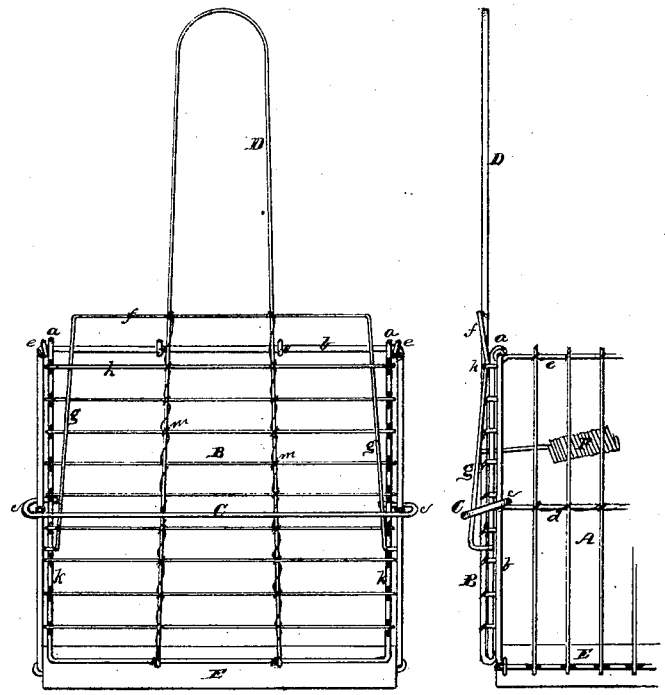
Figure 1 represents an end view of my improved animal trap.
Figure 2 represents a side view of so much of an animal trap as is necessary to illustrate my invention.
Figure 3:
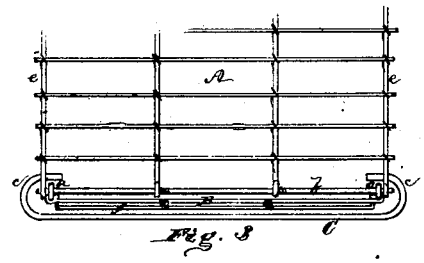
Figure 3 represents a plan view of the same.

To enable those skilled in the art to which my invention belongs to make and use the same, I will proceed to describe it more in detail.

The nature of my invention consists—

First, in the combination with the door and corner-wires of an animal trap of locking devices for the purposes hereinafter set forth.

Second, in the combination with the door of an animal trap of a locking-bar, for the purposes hereinafter set forth.

Third, in the combination with the door of the trap of a guard-wire, as and for the purposes hereafter explained.

Fourth, in the combination with the door of the trap and the locking-bar, or other locking devices employed, of inclined ways, for the purposes hereafter explained.

In the drawings—

The part marked A is the body of the trap, which may be constructed in any of the well-known modes of making animal traps.

B is the door of the trap, and is hinged at $a\ a$ to the front frame-wire $b$.

The catch and spring devices for setting and operating the trap are arranged in the usual manner, and are therefore not shown in the drawings, and a detailed description is consequently unnecessary.

Across the front of the door B is arranged a locking-bar, C, which has its end curved backward and inward, as shown at $c$; the hooks thus formed pass around the ends of the door B, and around the front frame-wire $b$, whereby the bar C is retained upon the trap, but can be moved up and down from the central frame-wire $d$ to the top frame-wire $e$, but cannot be, on account of the hooked ends $c$, drawn outward from the front of the trap.

Figure 4:
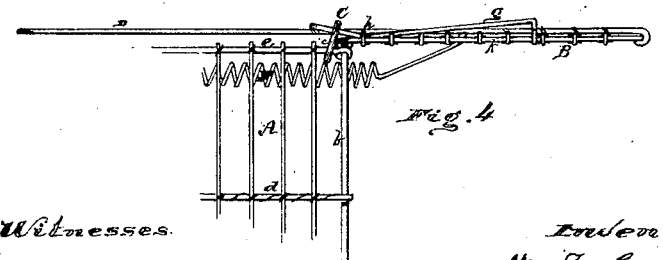
Figure 4 represents a side view of the same when the trap is set.

When the trap is set the locking-bar C is raised to the top of the trap, and the door B opened to the position shown in fig. 4.

A guard-wire, $f$, is arranged upon the door B, which extends somewhat higher than the top of said door, to prevent the locking-wire from catching upon the upper corners of the trap when the latter is sprung, and thereby preventing correct and instantaneous action.

The legs $g\ g$ of the guard-wire $f$ extend down the sides of the door B, passing beneath the upper bar $h$ of the door, and thence down outside of the remaining cross-bars of the door to a point somewhat below the line of the central side frame-wires $d\ d$, where they are turned back and looped, or hooked around the frame-wire K of the door B, so as to form inclined ways between the door B and the locking-bar C, and which inclined ways prevent the locking-bar from catching upon the cross-bars of the door, or upon the binding-wires $m\ m$, by which the bent setting-lever D is secured to the cross-bars of the door.

The inclined ways $g\ g$ also serve the purpose of wedges between the door B and the locking-bar C, and thus prevent any undue play between the latter after the locking-bar has descended to the position shown in figs. 1 and 2.

The body of the trap is made in this instance of wire properly netted or secured together, and in box form. It is secured to a wooden base or bottom, E, and is provided with two doors B, one at each end, each door being drawn down by a spiral spring, F, one end of which is attached to the door, and the other within the body of the trap.

The setting-levers D are made long enough to lap by each other when in position, as shown in fig. 4, whereby one setting device answers for both, and one or both doors may be set, as preferred in the latter case, both doors will be sprung at the same time.

The operation of this locking device is very simple, instantaneous and effective. The bar C is raised to the position shown in fig. 4, and the trap set. When the trap is sprung by the animal within, and the door drawn down by the spring F, the bar C is thrown to the front by the guard-wire $f$ as the door B closes, and is caused by its own weight to immediately drop into the position shown in figs. 1 and 2, where it is supported upon the side frame-wires $d$, and the door B is thereby secured, so that it cannot be pushed open by any animal which may be caught.

The locking-bar C may be combined with the sides of the frame in a somewhat different manner from that shown in the drawings, and still answer the purpose of locking devices, and it will be apparent to those skilled in the art to which my invention belongs that the locking devices may be constructed somewhat differently and still embrace the principle of my invention.

Having described my improvements in animal traps,

What I claim therein as new and of my invention, and desire to secure by Letters Patent, is—

1. The combination with the door and corner-wires of the frame of the trap of locking devices so constructed and arranged as to be conveniently raised to open the door and set the trap, but which locking devices will descend when the trap is sprung, and lock the door to the corner-wires of the frame.

2. The combination with the door of the trap and the sides of the frame of a locking device which can be conveniently raised to open the door and set the trap without tipping or turning the latter over.

3. A locking-bar, the ends of which are hooked to the corner-wires of the frame, and so arranged that when the door closes it will fall or descend upon the outside thereof, and thus prevent its being opened by the animal within the trap.

4. The combination with the door of the trap of a guard-wire or wires, $f$, substantially as and for the purposes set forth.

5. The combination with the door of the trap and the locking-bar, or other locking devices employed, of inclined ways, substantially as and for the purposes set forth.

WM. F. COLLIER.

Witnesses:
  THOS. H. DODGE,
  GEO. H. MILLER.